3,133,045
p-N-METHYL ACETAMIDOPHENOL AS CHAIN TERMINATOR FOR BISPHENOL POLYCARBONATES
Rudolph D. Deanin, West Hartford, Conn., and Ann V. Pinter, Morristown, N.J., assignors to Allied Chemical Corporation, New York, N.Y., a corporation of New York
No Drawing. Filed Feb. 20, 1961, Ser. No. 90,236
4 Claims. (Cl. 260—47)

This invention relates to the use of p-N-methyl acetamidophenol in reacting with phosgene a bisphenol alkane or aralkane, or their derivatives containing halogen attached to carbon in an aromatic ring, to form a polycarbonate, the p-N-methyl acetamidophenol acting to control the molecular weight of the polycarbonate product. The invention particularly relates to the use of that material in controlling the molecular weight of the polycarbonates produced by reacting phosgene with 2,2-bis(4-hydroxyphenyl) propane, commonly known as bisphenol A and hereafter so designated in this specification and claims. The term "bisphenol alkane" will be used in this specification to designate the several bisphenol alkanes, cycloalkanes and aralkanes and their derivatives which contain halogen attached to carbon in an aromatic ring.

It is known to prepare a mixture of a bisphenol, an aqueous caustic alkali solution and an organic solvent for phosgene in which the polycarbonates of the bisphenol are soluble. The bisphenol may or may not all be in solution in the aqueous caustic alkali in the form of the alkali metal salt of the bisphenol. Phosgene gas is introduced into this mixture to form the carbonate and polycarbonate of the bisphenol, and it is customary after completion of the introduction of the phosgene to agitate the reaction mixture for a period of time to permit growth of low molecular weight polycarbonate present to a desired higher molecular weight. A catalyst promoting the growth in molecular weight of the polycarbonate is introduced into the reaction mixture either before or after the introduction of the phosgene. A quaternary ammonium base or a tertiary amine is commonly used as this catalyst.

Extremely high molecular weight polycarbonates of the bisphenols can thus be obtained. For most purposes for which the product is to be used, however, it is desirable to be able to stop the growth in molecular weight at reasonably definite average molecular weights, and to be able to do this consistently in repeatedly carrying out the process. Accordingly, it has been proposed to have present in the phosgenated reaction mixture a chain terminating material, which, by reaction with the terminal radicals of the growing polycarbonate chains, serves to control their growth. As such chain terminators it is known to employ monohydroxy phenols, phenol itself or substituted phenols such as tertiary butyl phenol, and to introduce these materials prior to the phosgenation or prior to the subsequent period of growth.

Phenols in general, however, also react with the catalysts which are effective to promote the growth in molecular weight of the bisphenol polycarbonates. Particularly when relatively high concentrations of catalyst are present, about 1.0 mole percent or more of the catalyst by weight of the bisphenol present, much of the phenol added is wasted by reaction with the catalyst and uniform, reproducible control in the growth in molecular weight of the polycarbonate products is not obtained. If, in order to obtain satisfactory control in growth of the molecular weight, lower concentrations of the catalyst are employed, longer reaction periods or higher temperatures or both are required to obtain polycarbonates of a given molecular weight.

We have now found that by having present in the phosgenated mixture of aqueous caustic alkali, a bisphenol alkane and solvent for phosgene and the polycarbonate, p-N-methyl acetamidophenol to act as a chain terminator, particularly good control of the growth in molecular weight of the polycarbonates, to desired size can be obtained and the desired molecular weights are reproducible by maintaining uniformity in composition of the reaction mixtures and reaction conditions. This control is obtained even in the presence of relatively high concentrations of catalyst.

The phenolic hydroxy compounds act as chain terminators by reacting in the presence of the caustic alkali and phosgene with the reactive terminal radicals of the bisphenol polycarbonates to form non-reactive terminal radicals, which, in the case of our p-N-methyl acetamidophenol chain terminator, have the structure

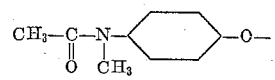

In operating in accordance with our invention the known procedures for producing a polycarbonate by phosgenating a mixture of a bisphenol, aqueous caustic alkali solution and an organic solvent for the phosgene and the polycarbonate product can be employed. Our invention is characterized by the presence of p-N-methyl acetamidophenol in the phosgenated mixture in small amounts with respect to the bisphenol which are effective to limit the growth in molecular weight of the polycarbonate product. This control of the molecular weight can be obtained in those processes for making the polycarbonates of the bisphenol alkanes having the structure

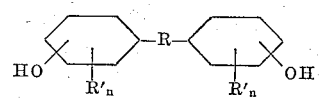

in which R is a divalent alkane, cycloalkane or aralkane radical containing only aromatic unsaturation, R' is a monovalent alkane radical and n is an integer from 0 to 4, and the derivatives of those bisphenols which contain halogen attached to carbon in an aromatic ring. The bisphenols having the above structure in which each of the two hydroxyl groups is in the 4-position of a phenylene radical and are linked through phenylene radicals, each pair of which is linked through a single carbon atom of a divalent alkane radical, and their derivatives containing halogen attached to carbon in an aromatic ring, are the preferred bisphenols for production of polycarbonates in accordance with our invention.

Examples of those bisphenols from which their polycarbonates can be prepared in the foregoing manners and the molecular weights of the polycarbonates can be controlled by the presence of the p-N-methyl acetamidophenol in accordance with our invention, are:

2,2-bis(4-hydroxyphenyl) propane,
Bis(4-hydroxyphenyl) methane,
1,1-bis(4-hydroxyphenyl) cyclohexane,
1,1-bis(4-hydroxy-3-methylphenyl) cyclohexane,
2,2-bis(2-hydroxy-4-tert-butylphenyl) propane,
3,4-bis(4-hydroxyphenyl) hexane,
1,1-bis(4-hydroxyphenyl)-1-phenyl ethane,
2,2-bis(4-hydroxyphenyl) butane,
2,2-bis(4-hydroxyphenyl) pentane,
3,3-bis(4-hydroxyphenyl) pentane,
2,2-bis(4-hydroxyphenyl)-3-methyl butane,
2,2-bis(4-hydroxyphenyl) hexane,
2,2-bis(4-hydroxyphenyl)-4-methyl pentane,
2,2-bis(4-hydroxyphenyl) heptane,
4,4-bis(4-hydroxyphenyl) heptane, and
2,2-bis(4-hydroxyphenyl) tridecane, as well as the halogen derivatives of those bisphenols, e.g.

2,2-bis(4-hydroxy-3-chlorophenyl) propane and
2,2-bis(4-hydroxy-3,5-dibromophenyl) propane.

We prefer to have present in the phosgenated reaction mixture a concentration of a catalyst of about 0.1 to about 2.2 mole percent by weight of the bisphenol to obtain rapid growth of the polycarbonate to the desired molecular weight, and to introduce prior to introduction of the phosgene, about 1.0 to about 3.0 mole percent of the p-N-methyl acetamidophenol by weight of the bisphenol. On the other hand, since the composition of the reaction mixture and reaction conditions as well as the amount of the chain terminator present in the phosgenated reaction mixture influence the molecular weight of the polycarbonate product, and the desired molecular weight may differ depending upon the particular use to which the polycarbonate product is to be put, the amount of p-N-methyl acetamidophenol can be varied to include amounts outside those limits and can be introduced after the phosgenation and before the post-phosgenation period during which the polycarbonate grows in molecular weight. Our chain terminator, however, will be present in the phosgenated reaction mixture in a small mole percentage by weight of the bisphenol which is effective to limit the molecular weight of the product to a lower molecular weight than that produced by that same process in the absence of the chain terminator.

The polycarbonates of bisphenol A having molecular weights ranging from about 10,000 to about 30,000 have properties making them suitable for most uses for the polycarbonates of the bisphenol alkanes and their halogenated derivatives, such as production of molded products or coating compositions. Our invention, therefore, will be more completely described and illustrated by the following examples for the production of those polycarbonates of bisphenol A. The molecular weights given are those calculated from the effluent times of an 0.1% solution of the polycarbonate in ethylene chloride and of the ethylene chloride solvent measured in an Ostwald-Fenske viscometer at 25° C., using the following equations:

$$N_r = \frac{\frac{T}{T'} - 1}{C}$$

$$N_i = N_r - 0.02$$

$$MW^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and MW is the molecular weight of the polycarbonate. Plotting the values for MW (as ordinates) at various values for $N_i$ (as abscissas) on common log-log graph paper gives a straight line, which was used to read directly the molecular weight.

*Example 1.*—A reaction vessel fitted with a stirrer, thermometer, reflux condenser and a gas inlet tube was charged with 500 cc. water, 31.5 gm. NaOH and 57 gm. bisphenol A, with a stream of nitrogen gas being passed into the reaction vessel. The mixture was stirred until the caustic soda and bisphenol A were dissolved in the water. The solution was cooled to room temperature. p-N-methyl acetamidophenol, amounting to 2.7 mole percent of the bisphenol A, dissolved in 508 cc. ethylene chloride was introduced into the reaction vessel. Benzyl triethyl ammonium chloride as catalyst was added as 6.4 cc. of a 10% aqueous solution of this material. This corresponded to 1.1 mole percent of the catalyst by weight of the bisphenol A. The flow of nitrogen gas was discontinued and phosgene gas, amounting to 27.5 gm. was then bubbled into the stirred material in the vessel at an even rate over a one hour period, with the reaction mixture being cooled to maintain it at 30° C. Following completion of the addition of the phosgene gas the reaction mixture was stirred for an additional 15 minutes to promote growth in molecular weight of the polycarbonate present in solution in the ethylene chloride. The resulting solution of polycarbonate in ethylene chloride was separated from the aqueous phase present, washed with dilute hydrochloric acid and then with water. Acetone amounting to 290 cc., followed by 500 cc. of methanol were stirred into the acid and water washed solution to precipitate the polycarbonate. The solid polymer was filtered off and dried in air at 120° C. The dried polycarbonate of bisphenol A had a molecular weight of 30,000.

Employing the same reaction mixture and procedure of above Example 1, except for no addition of the p-N-methyl acetamidophenol with the ethylene chloride, the polycarbonate produce had a molecular weight of 50,000. With 0.27 mole percent of phenol by weight of the bisphenol A added as chain terminator, the molecular weight of the product was 100,000. Other monohydroxy phenols, such as orthocresol, orthophenyl-phenol, p-benzyl phenol, nonyl phenol, beta-naphthol and p-methoxy phenol, substituted for the chain termiator employed in Example 1 gave products with molecular weights ranging from 50,000 to 117,000.

*Example 2.*—The same equipment and procedure, except that following introduction of the phosgene gas the reaction mixture was stirred for an additional period of one hour, was employed for reacting the bisphenol A in solution in aqueous caustic soda with the phosgene gas in the presence of the benzyl triethyl ammonium chloride catalyst, 500 cc. of methylene dichloride and 2.7 mole percent of the p-N-methyl acetamidophenol, based on the bisphenol A present, as chain termiator. The polycarbonate recovered from solution in the methylene dichloride was air dried in the same manner as in Example 1. It had a molecular weight of 23,400.

Modifying this procedure of Example 2 by employing 1.35 mole percent of the p-N-methyl acetamidophenol as chain terminator the molecular weight of the polycarbonate was 51,000.

We claim:
1. In a process for producing a polycarbonate by phosgenating a mixture of (1) a member of the group consisting of the bisphenols having the structure

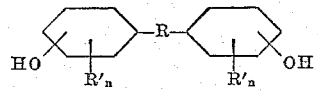

in which R is a member of the group consisting of the divalent alkane, cycloalkane and aralkane radicals containing only aromatic unsaturation, R' is a monovalent alkane radical and $n$ is an integer from 0 to 4, and the halogenated derivatives of those bisphenols which contain the halogen attached to carbon in an aromatic ring, (2) an aqueous caustic alkali solution, and (3) an organic solvent for the phosgene and the polycarbonate product, with a catalyst promoting growth in molecular weight of the polycarbonate and a monohydroxyphenol chain terminator to control that growth also present in the phosgenated reaction mixtures, that improvement which comprises having present in the phosgenated reaction mixture as said monohydroxyphenol chain terminator a small mole percentage by weight of the bisphenol of p-N-methyl acetamidophenol effective to limit growth of the polycarbonate molecules to a lower molecular weight than that produced in the absence of the chain terminator.

2. The process of claim 1 in which the catalyst present amounts to about 0.1 to about 2.2 mole percent and the p-N-methyl acetamidophenol amounts to about 1.0 to about 3.0 mole percent, both by weight of the bisphenol.

3. The process of claim 1 in which the bisphenol is 2,2-bis(4-hydroxyphenyl) propane.

4. The process of claim 2 in which the bisphenol is 2,2-bis(4-hydroxyphenyl) propane.

References Cited in the file of this patent

UNITED STATES PATENTS

| | | |
|---|---|---|
| 2,964,794 | Peilstöcker et al. | Dec. 20, 1960 |
| 2,970,131 | Moyer et al. | Jan. 31, 1961 |